United States Patent
Sekhar

(10) Patent No.: US 8,111,676 B2
(45) Date of Patent: *Feb. 7, 2012

(54) LOSELESS ROAMING VIA BRIDGING BETWEEN ACCESS PORTS

(75) Inventor: Ramesh Sekhar, San Jose, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 837 days.

This patent is subject to a terminal disclaimer.

(21) Appl. No.: 11/942,422

(22) Filed: Nov. 19, 2007

(65) Prior Publication Data

US 2008/0192715 A1  Aug. 14, 2008

Related U.S. Application Data

(63) Continuation-in-part of application No. 11/495,448, filed on Jul. 28, 2006.

(51) Int. Cl.
*H04W 4/00* (2009.01)
(52) U.S. Cl. ........ 370/338; 370/331; 370/332; 370/390; 455/574; 700/26; 700/275
(58) Field of Classification Search .................. 370/338, 370/331, 332, 390; 455/574; 700/275, 26
See application file for complete search history.

(56) References Cited

U.S. PATENT DOCUMENTS

| 4,688,183 | A | 8/1987 | Carll et al. |
| 6,125,279 | A | 9/2000 | Hyziak et al. |
| 6,363,267 | B1 * | 3/2002 | Lindskog et al. ............. 455/574 |
| 7,096,039 | B2 * | 8/2006 | Chuah et al. .................. 455/561 |

(Continued)

FOREIGN PATENT DOCUMENTS

EP  1443715 A  8/2004

(Continued)

OTHER PUBLICATIONS

First Office Action for U.S. Appl. No. 11/495,448 mailed May 15, 2009, the parent application of U.S. Appl. No. 11/942,422.

(Continued)

*Primary Examiner* — Nimesh Patel

(57) ABSTRACT

In a network comprising a wireless device, a first access point (AP) and a plurality of neighbor APs, a method is provided for reducing the chances of packet loss when the wireless device roams from the first AP to one of the neighbor APs. For example, when the first AP is transmitting a particular packet of a packet stream from to the wireless device, the wireless device begins to move away from the first AP toward at least one of the neighbor APs. The first AP maintains an acknowledgement counter for the particular packet which counts a number of times the particular packet has been transmitted by the first AP without receiving an acknowledgement (ACK) message from the wireless device confirming successful reception of the particular packet from the first AP. The first AP determines whether an ACK message was received for the particular packet, and if not, the first AP determines whether the number of times the particular packet has been sent is equal to a particular number of attempts. If the first AP determines that the number of times is equal to the particular number of attempts, then the first AP forwards the particular packet to the neighbor APs. Any of the neighbor APs which receive the particular packet, can then format the source address field of the particular packet with the MAC address of the first AP, and forward it to the wireless device.

4 Claims, 4 Drawing Sheets

U.S. PATENT DOCUMENTS

| | | |
|---|---|---|
| 7,457,267 B1 | 11/2008 | O'Neill |
| 2003/0143973 A1* | 7/2003 | Nagy et al. .................... 455/403 |
| 2003/0174688 A1* | 9/2003 | Ahmed et al. ................ 370/349 |
| 2006/0002350 A1 | 1/2006 | Behroozi |
| 2006/0083201 A1* | 4/2006 | He et al. ........................ 370/331 |
| 2007/0002833 A1 | 1/2007 | Bajic |
| 2008/0089287 A1* | 4/2008 | Sagfors et al. ................ 370/331 |

FOREIGN PATENT DOCUMENTS

| | | |
|---|---|---|
| EP | 1601221 A | 11/2005 |

OTHER PUBLICATIONS

PCT/US2007/073956—International Application of parent U.S. Appl. No. 11/495,448—International Search Report mailing date Mar. 3, 2008.

Stallings,—IEEE 802.11: "Wireless LANs from a to n" Sep. 2004, IT Professional, IEEE Service Center, Los Alamitos—vol. 6, No. 4, pp. 32-37.

Final Rejection of U.S. Appl. No. 11/495,448 mailed Jul. 15, 2010, the parent application of U.S. Appl. No. 11/942,422.

\* cited by examiner

LOSELESS ROAMING VIA BRIDGING BETWEEN ACCESS PORTS

PRIORITY CLAIM

This application is a Continuation-in part of U.S. patent application Ser. No. 11/495,448 filed on Jul. 28, 2006 entitled "Method and System for Loss-Less Roaming with Wireless Bridging". The entire disclosure of this prior application is considered as being part of the disclosure of the accompanying application and hereby expressly incorporated by reference herein.

TECHNICAL FIELD

The present invention generally relates to wireless computer networks and, more particularly, to methods, systems and apparatus for lossless roaming in wireless computer network.

BACKGROUND

A wireless local area network (WLAN) generally includes one or more Access Ports (APs), and several wireless client devices which communicate with the wired network via the APs. As the number of APs increases, the network becomes more difficult to manage. To help alleviate this problem a master controller sometimes referred to as a "wireless switch" can be added to the network which controls one or more APs. A wireless switch controls some or all of the APs in the network, and data going to or from the APs flows through the wireless switch. This way, a single wireless switch can have multiple, geographically distributed APs connected with overlapping coverage areas.

Because mobility is a key driver in the deployment of wireless networks, most WLANs attempt to give wireless client devices (WCDs) the ability to "roam" or physically move from place to place without being connected by wired connections. In this application "roaming" generally describes the physical movement of a WCD between APs. When a WCD moves or "roams" out of the communication range of its original AP and into communication range of a new AP, the WCD re-associates with the new AP after a certain period of time. A typical roaming time on an encrypted link from the original AP to another encrypted link on the new AP is between 20 and 50 milliseconds or more for networks which include wireless switches.

However, in many cases the delay or latency which occurs between the time when the WCD begins roaming and when it finally re-associates with its new AP is insufficient. In many cases, all of the packets transmitted from or to the WCD will not be received. For example, when the WCD has an active call or session that is being communicated through the original AP, during the time which elapses while the WCD is roaming from its original AP to its new AP, packets sent from the original AP will be "dropped" and will not be received by the WCD. Likewise, packets sent from the WCD to the original AP will not be received by the original AP. As such; there is no way to guarantee that the packet(s) from the original AP will reach the WCD when the WCD is out of the range of the original AP, and vice-versa. Roaming is costly for time-critical applications, such as voice applications, since several voice packets might be lost during the roaming interval especially in networks which employ wireless switches since these networks have high latency layer 3 (L3) tunnels between the wireless switch and the APs controlled by that wireless switch.

One approach to solving this roaming problem is to delay/store packets and then retransmit the same packets through the new AP, after the WCD moved to the new AP. However, in a time-critical applications, such as voice applications including Voice-over-WLAN, delaying a packet for more than a certain amount of time (e.g., 30 ms) is essentially the same as dropping it, and therefore this approach is not viable.

Another approach to solving the roaming problem is to have all APs configured as part of the same Basic Service Set (BSS) and to operate on the same channel. This way the entire coverage area appears to be covered by a single AP. However, with this approach a very low latency link/tunnel is required between the wireless switch and the APs since the beacons from each AP must be tightly coordinated so that wireless communication devices do not get confused regarding the beacon timings and bit mask settings. This rules out implementing a L3 tunnel between the wireless switch and the APs controlled by that wireless switch.

Accordingly, it is desirable to provide improved wireless switching methods for allowing a wireless client device to move between access ports without losing or dropping packets. It would also be desirable to eliminate the roaming problem in a way that is independent of the type of tunnel between the wireless switch and the APs controlled by that wireless switch. Furthermore, other desirable features and characteristics of the present invention will become apparent from the subsequent detailed description and the appended claims, taken in conjunction with the accompanying drawings and the foregoing technical field and background.

SUMMARY

Techniques are provided for improving roaming of a wireless device in a network of APs including a first access point (AP) and a plurality of neighbor APs. These techniques can reduce the chances of packet loss when the wireless device roams from the first AP to one of the neighbor APs.

According to one embodiment, when the first AP is transmitting a particular packet of a packet stream to the wireless device, the wireless device begins to move away from the first AP toward at least one of the neighbor APs. The first AP maintains an acknowledgement counter for the particular packet which counts a number of times the particular packet has been transmitted by the first AP without receiving an acknowledgement (ACK) message from the wireless device confirming successful reception of the particular packet from the first AP. The first AP determines whether the acknowledgement (ACK) message was received for the particular packet, and if not, the first AP determines whether the number of times the particular packet has been sent is equal to a particular number of attempts. If the first AP determines that the number of times is equal to the particular number of attempts, then the first AP forwards the particular packet to the neighbor APs. Any of the neighbor APs which receive the particular packet, can then format the source address field of the particular packet with the MAC address of the first AP, and forward it to the wireless device.

According to another embodiment, where the first access point (AP) is receiving a packet stream from the wireless device, the first AP starts a timer whenever first AP receives a packet from wireless device. The timer maintains a time since a last packet was received from the wireless device. The first AP determines whether a next packet of the packet stream has been received from wireless device, and if not, determines, whether the timer has expired. If the first AP determines that the timer has expired the first AP can assume that the wireless device has roamed away from the first AP, and transmit a transfer message from the first AP to the neighbor APs. Upon receiving the transfer message, the neighbor APs determine whether any incoming packets are received from the wireless device, and if so, forward these packets to the first AP.

BRIEF DESCRIPTION OF THE DRAWINGS

The present invention will be described in conjunction with the following drawing figures, wherein like numerals denote like elements.

DETAILED DESCRIPTION

Figure 1:
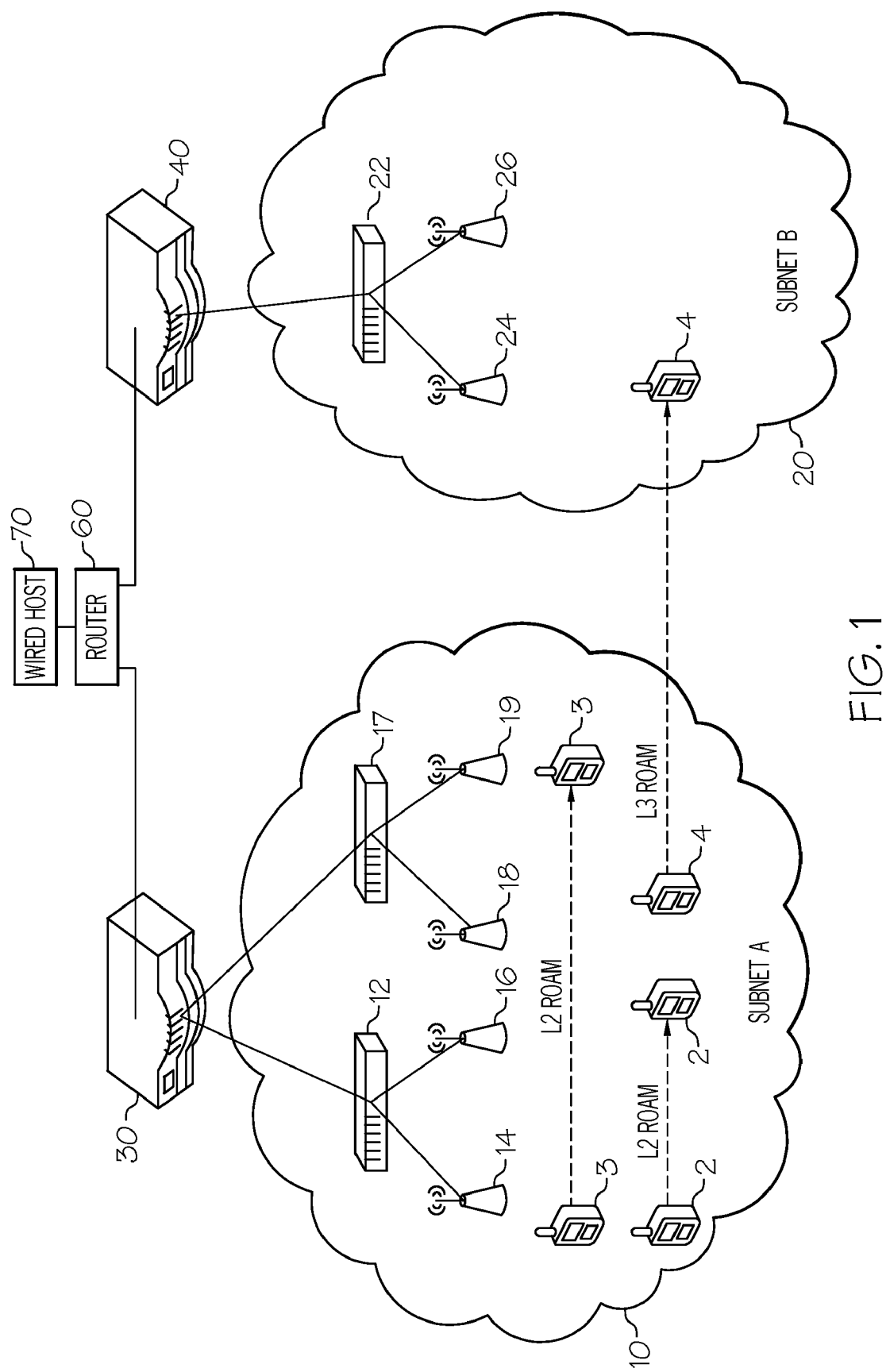
FIG. 1 is a simplified diagram of an exemplary wireless local area network (WLAN)

The following detailed description is merely exemplary in nature and is not intended to limit the invention or the application and uses of the invention. As used herein, the word "exemplary" means "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims. Furthermore, there is no intention to be bound by any expressed or implied theory presented in the preceding technical field, background, or brief summary.

In the following description, those of skill will appreciate that the various illustrative logical blocks, modules, circuits, and algorithm steps described in connection with the embodiments disclosed herein may be implemented as a combination of electronic hardware and computer software. To clearly illustrate this combination of hardware and software, various illustrative components, blocks, modules, and steps have been described above generally in terms of their functionality. Whether such functionality is implemented as hardware and software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in a hardware module. A hardware module may include software that resides in RAM memory, flash memory, ROM memory, EPROM memory, EEPROM memory, registers, hard disk, a removable disk, a CD-ROM, or any other form of storage medium known in the art. An exemplary storage medium is coupled to a processor of the hardware module such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a device.

From the perspective of the application, the roaming problem is a "lost packets" issue, not a latency issue. For example, there is no difference between a zero millisecond roam with zero packet loss, and a 20 millisecond roam with zero packet loss. This is particularly true with time-critical applications, such as voice applications.

Embodiments of the present invention resolve the unfilled needs describe above which include reducing the chances of packet loss when a wireless communication device roams between access ports. In one exemplary embodiment, lossless roaming techniques are provided in which packet(s) transmitted during a move are wirelessly bridged between the original AP and a neighbor AP that the wireless communication device roams to. After attempting to send a particular packet to the wireless communication device a given number of times, the original AP can wirelessly forward the particular packet to its neighbor APs, which then transmit the particular packet to the wireless communication device on behalf of the original AP. In most scenarios, the wireless communication device will move to a neighbor AP, and therefore will receive the particular packet which would have otherwise been lost or dropped. Prior to describing exemplary embodiments of the invention, a generalized description of an exemplary wireless network and an exemplary access point (AP) will be provided with respect to FIGS. 1 and 2.

Exemplary Network Architecture

FIG. 1 is a simplified block diagram of an exemplary wireless local area network (WLAN). As used herein, the term "Wireless Local Area Network (WLAN)" refers to a network in which a mobile user can connect to a local area network (LAN) through a wireless (radio) connection. The IEEE 802.11 standard specifies some features of exemplary wireless LANs.

The exemplary WLAN of FIG. 1 includes wireless client devices 2, 3, 4, a first subnet (A) 10, wireless switches 12, 17 coupled to access points (APs) 14, 16 and APs 18, 19, respectively, a second subnet (B) 20, a wireless switch 22 coupled to access points (APs) 24, 26, layer 2 (L2) switches 30, 40 coupled to wireless switches 12, 17 and wireless switch 22, respectively, and a layer 3 (l3) router 50 coupled to the L2 switches 30, 40.

The L2 switch 30 is coupled to the wireless switches 12, 17. As used herein, the term "wireless switch (WS)" refers to a device that channels incoming data from any of multiple input ports to the specific output port that will take the data toward its intended destination. A switch typically performs the data-link or layer 2 functions and determines, from the MAC address in each packet, which output port to use for the next part of its trip to the intended destination. In some embodiments, the switch can function as an IP switch which may also perform network or layer 3 routing functions.

The wireless switch 12 supports the first subnet (A) 10 and is coupled to the access points (APs) 14, 16, and the wireless switch 17 supports the first subnet (A) 10 and is coupled to the access points (APs) 18, 19. As used herein, the term "access port (AP)" refers to a device connected to a local area network (LAN) that enables remote wireless stations to communicate with the LAN. An AP is a network-capable device containing a transceiver and antenna for transmitting signals to and receiving signals from the remote stations. The AP thus provides a "point of access" to the wired network for the remote stations. APs allow wireless stations to be quickly and easily connected to a wired LAN. An AP connects users to other users within the network and also can serve as the point of interconnection between the WLAN and a fixed wire network. Each AP can serve multiple users within a defined network area. As a client moves beyond the range of one AP, the client can be automatically handed over to the next AP. In general, a WLAN may only require a single AP. The number of APs in a given subnet generally increases with the number of network users and the physical size of the network. As used herein, the term sub-network or "subnet" refers to an identifiably separate part of a network. Typically, a subnet may represent all the machines at one geographic location, in one building, or on the same wireless local area network (WLAN). One standard procedure for creating and identifying subnets is described in Internet Request for Comments (RFC) 950.

The L2 switch 40 is coupled to the wireless switch 20. The wireless switch 22 supports the second subnet (B) 20 and is coupled to the access points (APs) 24, 26.

The wireless switches 12, 17, 22 communicate with the wireless client devices 2, 3, 4 via the access points 14, 16, 18, 19, 24, 26. As used herein, a "client" is a mobile device in a WLAN. The term "wireless client device" or "mobile device" can generally refer to a wireless communication device or other hardware with which an access network communicates. At any given time a mobile device may be mobile or stationary and can include devices that communicate through a wireless channel or through a wired channel. A mobile device may further be any of a number of types of mobile computing devices including but not limited to a laptop computer, a PC card, compact flash, external or internal modem, wireless or wireline phone, personal digital assistant (PDA) or mobile telephone handset.

The wireless client devices 2, 3, 4 can physically move around the WLAN, and communicate with an IP network via the access points (APs) 14, 16, 18, 19, 24, 26.

The L3 router 60 provides connectivity to an external network. Each interface on the router is associated with an independent IP subnet (e.g. subnet A, subnet B) as shown in FIG. 1. Traffic that goes between interfaces (i.e. between IP subnets) is routed using standard rules of the IP.

FIG. 1 illustrates the concept of wireless client device 2 roaming in the WLAN. As shown in FIG. 1, roaming occurs when a client 2 moves far enough away from its AP 14 such that its radio associates with a different AP 16 in the same subnet. The client 2 disconnects from AP 14 and re-connects to another AP 16 in the same subnet (broadcast domain) where several APs use the same Service Set Identifier (SSID). To initiate a roam, the client 2 sends an associate (or reassociate) request to the new AP 16. It may disassociate from the old AP 14, or the old AP 14 may notice the client 2 is no longer there. Roaming also occurs when a wireless client device 4 moves from an AP within its home IP subnet, such as the first subnet (A) 10, to a new AP within a foreign IP subnet, such as the second subnet (B) 20.

When wireless client devices 2, 3 successfully roam, the associated wireless switches attempt to route traffic for the wireless client device 2, 3 to the new AP. In some situations the WCD roams to a new AP and the latency associated with such a roaming transition can be insufficient since the amount of packet loss and/or delay introduced during these procedures are unsuitable. This is especially true for time-critical WLAN applications, such as voice over IP (VoIP) over 802.11 or streaming over 802.11. For applications like wireless Voice-over-IP phones or streaming applications, this packet loss is not acceptable since it degrades the quality of the call or in some cases causes the call/session to drop entirely. Thus, it would be desirable to provide techniques and technologies which can make roaming as transparent as possible to the user.

Exemplary Access Port

Figure 2:
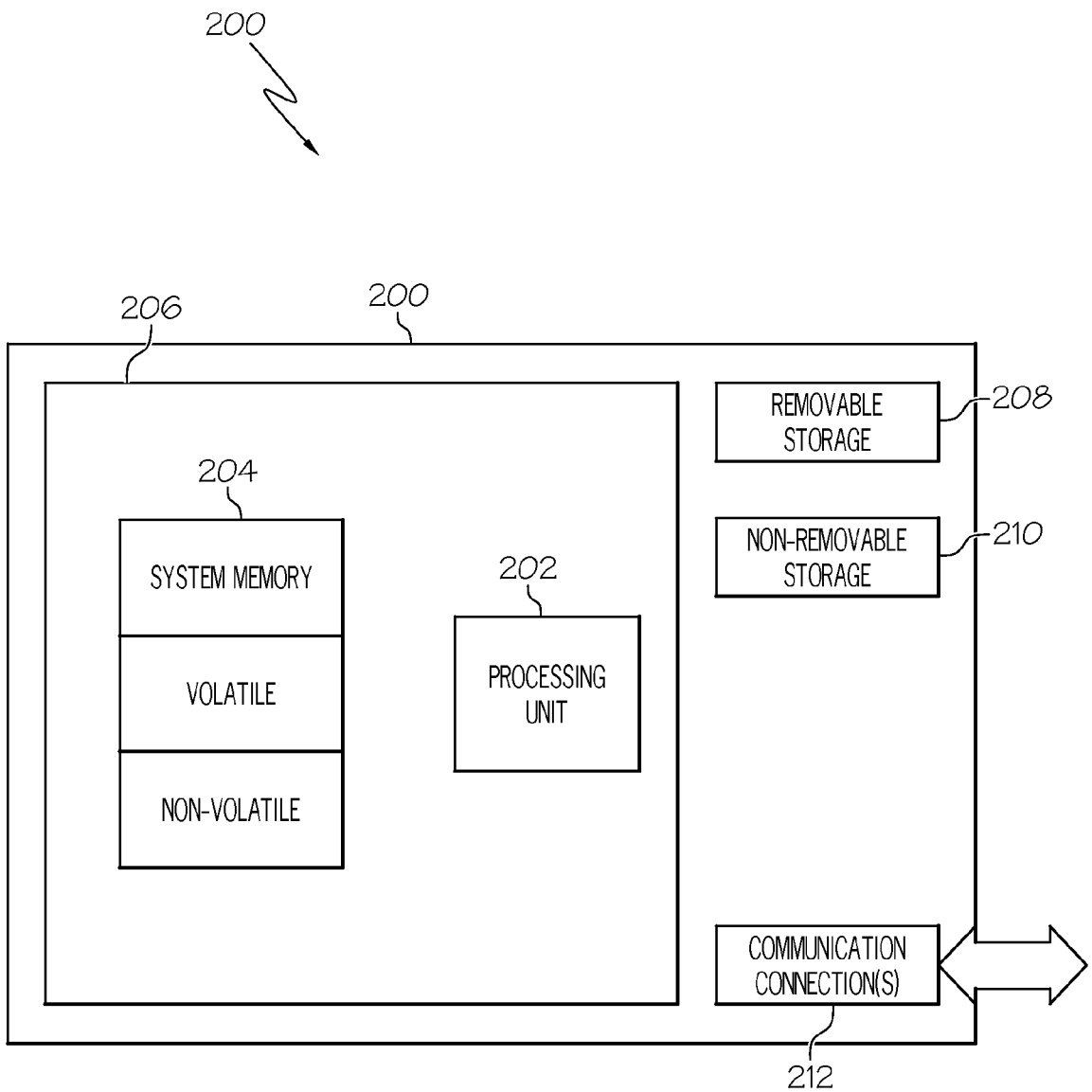
FIG. 2 is a simplified block diagram of an exemplary wireless access port (AP)

FIG. 2 is a simplified block diagram of an exemplary AP 200. AP 200 is only one exemplary AP and is not intended to suggest any limitation as to the scope of use or functionality of the invention. AP 200 and certain aspects of embodiments of the invention may be described in the general context of computer-executable instructions, such as program modules, executed by one or more computers or other devices. Generally, program modules include routines, programs, objects, components, data structures, and/or other elements that perform particular tasks or implement particular abstract data types. Typically, the functionality of the program modules may be combined or distributed as desired in various embodiments.

AP 200 typically includes at least some form of computer readable media. Computer readable media can be any available media that can be accessed by AP 200 and/or by applications executed by AP 200. By way of example, and not limitation, computer readable media may comprise computer storage media and communication media. Computer storage media includes volatile, nonvolatile, removable, and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by AP 200. Computer storage media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal.

Referring again to FIG. 2, in its most basic configuration, AP 200 typically includes at least one processing unit 202 and a suitable amount of memory 204. Depending on the exact configuration and type of computing system 200, memory 204 may be volatile (such as RAM), non-volatile (such as ROM, flash memory, etc.) or some combination of the two. This most basic configuration is identified in FIG. 2 by reference number 206. Additionally, AP 200 may also have additional features/functionality. For example, AP 200 may also include additional storage which is illustrated in FIG. 2 by removable storage 208 and non-removable storage 210.

Memory 204, removable storage 208, and non-removable storage 210 are all examples of computer storage media as defined above.

AP 200 may also contain communications connection(s) 212 that allow the system to communicate with other devices. Communications connection(s) 212 may be associated with the handling of communication media including wired media such as a wired network or direct-wired connection, and wireless media such as RF, infrared and other wireless media.

Exemplary Embodiments

Figure 3:
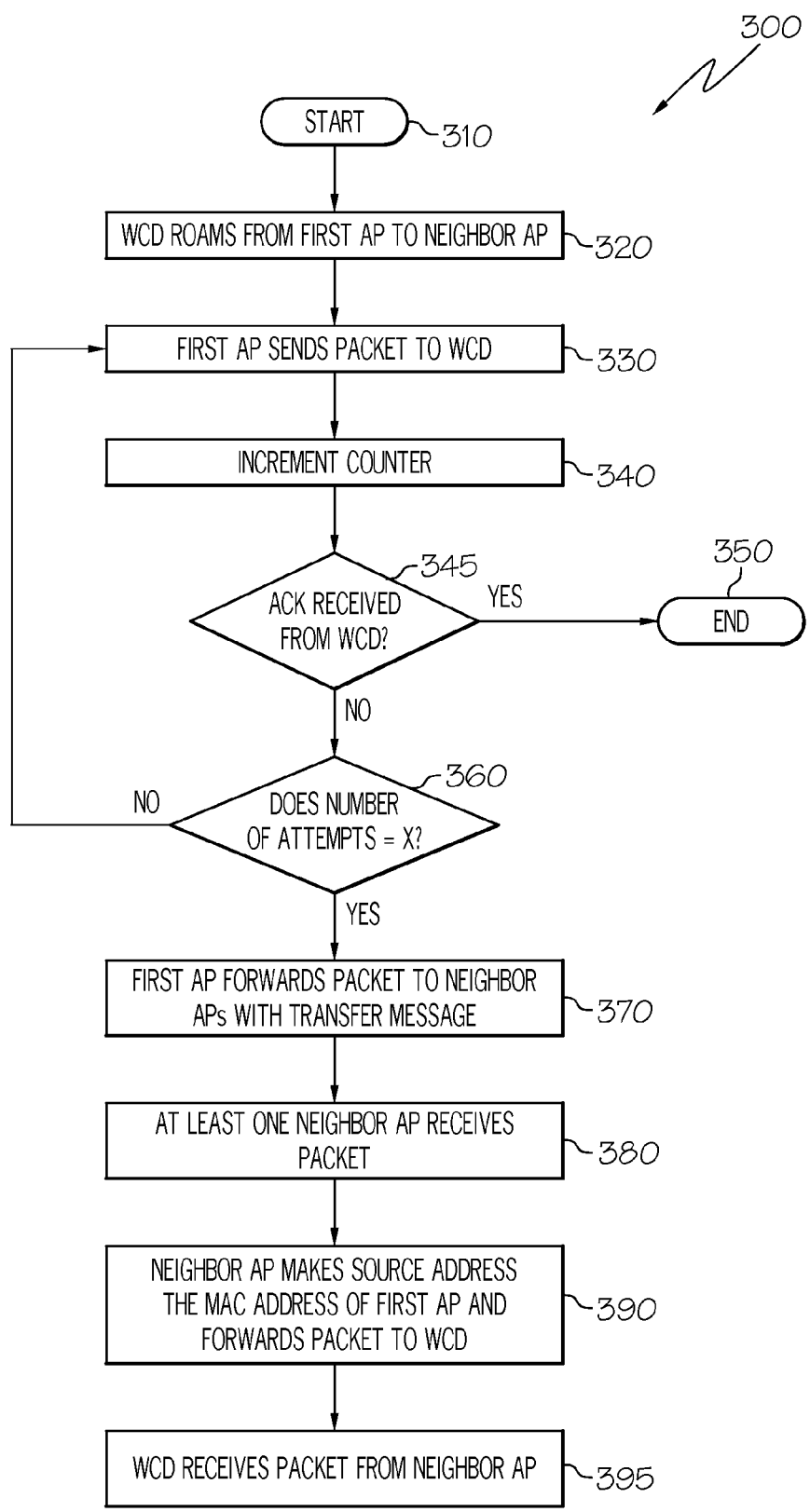
FIG. 3 is a flow chart showing a method for use when a wireless client device (WCD) receiving a packet stream roams from one AP to a neighbor AP in accordance with one exemplary implementation.

FIG. 3 is a flow chart showing a method 300 for use when a wireless client device (WCD) 2 receiving a packet stream roams from one AP 14 to a neighbor AP 16, 18, 19 in accordance with one exemplary implementation.

When the method begins at step 310, it is assumed that the wireless client device (WCD) 2 is receiving a packet stream from AP 14. As used herein, the term "packet stream" refers to a series of "packets," where a "packet" refers to a unit of data that is routed between an origin and a destination on a packet-switched network such as the Internet. As will be appreciated by those skilled in the art, when any file is sent from one place to another on the Internet, the Transmission Control Protocol (TCP) layer divides the file into "chunks" of an efficient size for routing. Each of these packets is separately numbered and includes the Internet address of the destination. In the context of the User Datagram Protocol (UDP), it should be appreciated that the term "datagram" has a similar meaning to the term "packet." For example, in one embodiment, the packet stream can be a stream of voice packets being received by the WCD 2 in a wireless VoIP call or Voice-over-WLAN call. In another embodiment, the packet stream can be a stream of data packets being received from a messaging application by the WCD 2 in a messaging call/session. In another embodiment, the packet stream can be a stream of data packets being received from an e-mail application by the WCD 2. In another embodiment, the packet stream can be a stream of data packets being received from a multimedia application by the WCD 2 during a multimedia call/session. Upon successfully receiving a packet or group of packets of the packet stream, the WCD 2 sends an acknowledgement (ACK) message acknowledging reception of the packet or group of packets from the wireless AP 14.

At step 320, the WCD 2 roams from AP 14 to a new AP 16 on the same Virtual Local Area Network (VLAN) which in this case is L3 subnet 10. In this situation, WCD 2 is mapped to the same VLAN ID. As used herein, the term "VLAN" refers to group of access ports on an Ethernet switch which behave like a separate network segment. VLANs allow networks to be segmented logically without having to be physically rewired. Instead of having all access ports on a switch belong to the same network, access ports can be segregated into groups, each belonging to a separate logical network. VLANs subdivide a physical LAN into multiple virtual local area networks or multiple smaller broadcast domains without needing additional network devices, such as routers. One wireless switch may have several VLANs defined on it. A VLAN can be identified using a special identification number called a VLAN ID. Wireless client devices attached to switch ports having the same VLAN ID act and function as though they are all on the same physical network segment. The VLAN ID is transmitted in every packet associated with that VLAN. For more information see the IEEE 802.1Q standard on VLANs.

At step 330, the AP 14 continues to send next particular packet of the packet stream to the WCD 2; however, at this point, since WCD 2 has roamed out of communication range of AP 14, WCD 2 is no longer in communication range of AP 14, and therefore the particular packet will not be received by WCD 2.

For each packet the AP 14 sends to the WCD 2, the AP 14 maintains a counter. At step 340, the AP 14 increments a counter by one. This counter counts the number of times the AP 14 has sent (e.g., attempted to transmit) the particular packet without receiving an acknowledgement (ACK) message from the WCD 2.

At step 345, the AP 14 determines whether the WCD 2 has acknowledged reception of a particular packet. If the AP 14 does receive an ACK message from the WCD 2 acknowledging reception of the particular packet, then the method 300 ends at step 350.

If the AP 14 does not receive an ACK message from the WCD 2 acknowledging reception of the particular packet, then method 300 proceeds to step 360, where the AP 14 determines whether the number of attempts to send the particular packet is equal to a particular number of attempts. The particular number of attempts is equal to one plus a maximum number of retries. In other words, after the AP 14 transmits the particular packet the first time, the AP 14 will attempt to retransmit the particular packet a certain number of times before the AP 14 determines that another neighbor AP should attempt to transmit the particular packet to the WCD 2. Limiting the number of retransmissions that AP 14 will make in attempting to send the particular packet to the WCD 2 to a certain number of retries (e.g., five) can be important in cases where AP 14 does not receive communications from WCD 2 (even though WCD 2 may still be receiving from AP 14). In such situations, the particular packet will automatically be bridged to a neighbor AP after the certain number of retries (e.g., five) instead of dropping the particular packet after a fixed number (e.g., fifteen) retries.

The particular number of attempts depends on a variety of factors, such as, the type of application that is generating the packets of the packet stream, the rate at which a particular WCD may be reached, the load on the AP, the load on the neighboring APs, and the SNR of the channel, the AP perceived link quality based on link quality measurements, and the like. For example, for packets generated by a voice application (e.g., G.729 voice stream), the particular number of attempts would be relatively low (e.g., five attempts for a 60 ms voice stream). For packets generated by a real time video application (e.g., MP2 or H.264), the particular number of attempts would be relatively higher (e.g., between five and fifteen) in some implementations. By contrast, for packets generated by a data application such as an e-mail or text messaging application, the particular number of attempts would be relatively higher and might be five or more in some implementations.

If the AP 14 determines that the number of attempts to send the particular packet is less than the particular number of attempts or "retries," then the method loops back to step 330 where the AP 14 resends or "retranmits" the particular packet of the packet stream to the WCD 2 again.

If the AP 14 determines that the number of attempts to send the particular packet is equal to (or possibly greater than) the particular number of attempts or "retries," then the method 300 proceeds to step 370 where the AP 14 forwards the particular packet (or group of packets or the packet stream) to its neighbor APs 16, 18, 19. In one exemplary embodiment, the AP 14 attaches a transfer message to the particular packet before forwarding the particular packet (or group of packets or the packet stream) to its neighbor APs 16, 18, 19. The transfer message communicates that AP 14 is transferring a packet stream which is associated with WCD 2. This way the neighbor APs 16, 18, 19 understand how to handle the particular packet (or group of packets or the packet stream) before it is received from AP 14. In one implementation, the transfer message can be implemented within a standard 802.11 header field where From-DS and To-DS bits both set, and a four-address scheme is implemented for forwarding packets from one AP to the neighbor AP(s).

At step 380, the neighbor AP(s) receive the particular packet (or group of packets or the packet stream) from AP 14, and at step 390, the neighbor AP(s) insert the MAC address of AP 14 into the source address field of the particular packet and then transmits the particular packet to all devices within its communication range. This way the neighbor APs 16, 18, 19 "pretend" to be AP 14 and from the perspective of WCD 2 it appears that the particular packet is still coming from AP 14. Although not illustrated in FIG. 3 for purposes of clarity, in some implementations, the neighbor AP(s), upon transmitting the particular packet (or group of packets or the packet stream), can perform steps similar to steps 340-360 described above. In other words, a particular neighbor AP maintains a counter for each packet it sends to the WCD 2, which counts the number of times the particular neighbor AP has sent (e.g., attempted to transmit) the particular packet without receiving an acknowledgement (ACK) message from the WCD 2, and if the particular neighbor AP does not receive an ACK message from the WCD 2 within a certain number of attempts (e.g., one plus a maximum number of retries or retransmissions), the particular neighbor AP determines that another neighbor AP should attempt to transmit the particular packet to the WCD 2, and the particular packet will automatically be bridged to its neighbor AP(s) with a transfer message which communicates that neighbor AP(s) is transferring a packet stream which is associated with WCD 2.

Referring again to FIG. 3, if the WCD 2 is within the wireless communication range of one of the neighbor APs 16, 18, 19, then step 395, the WCD 2 will receive the particular packet (or group of packets or the packet stream) from that neighbor AP seamlessly as if the WCD 2 had never roamed out of the coverage area of AP 14. During the roaming transition time, this approach buys some time for the WCD 2 to associate with the neighbor AP and begin communicating with the neighbor AP without loosing the packet or packets communicated from AP 14 during this transition. Packets that would have usually been dropped during the WCD's move from AP 14 to a neighbor AP, will not be dropped. As such, the probability the particular packet (or group of packets) reaching the WCD 2 over the wireless channel is increased. This can be particularly beneficial in improving roaming transitions during the middle of a voice call, and can improve the performance of applications, such as Voice-over-WLAN which typically used unacknowledged protocols like UDP.

As will be described below with respect to FIG. 4, a similar method 300 can also be implemented with respect to packets or packet streams transmitted from the WCD 2 to APs.

Figure 4:
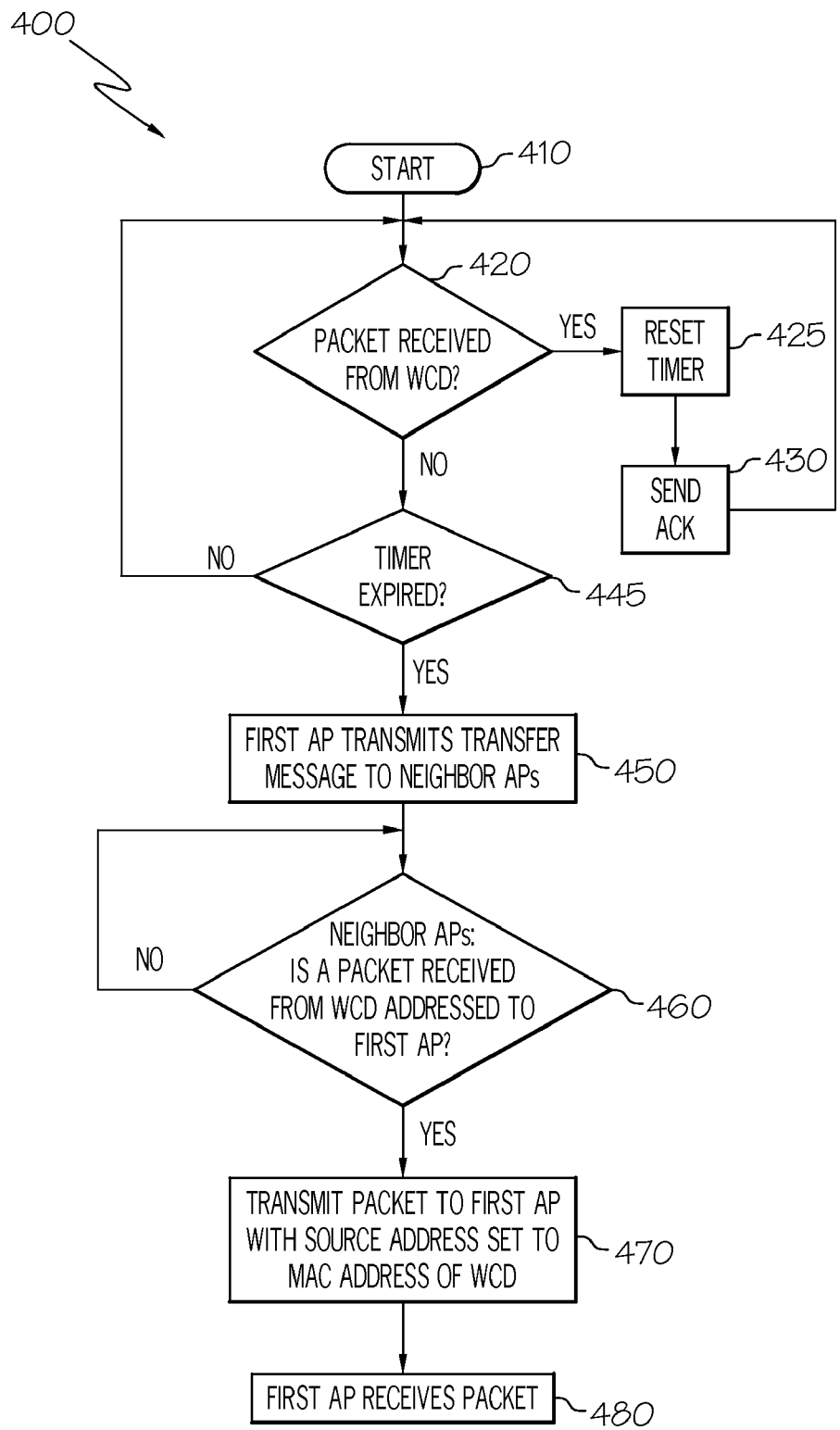
FIG. 4 is a flow chart showing another a method for use when a wireless client device (WCD) transmitting a packet stream roams from one AP to a neighbor AP in accordance with another exemplary implementation.

FIG. 4 is a flow chart showing another method 400 for use when a wireless client device (WCD) 2 transmitting a packet stream roams from one AP 14 to a neighbor AP 16, 18, 19 in accordance with another exemplary implementation.

When the method 400 begins at 410, it is assumed that AP 14 is receiving a packet stream from WCD 2. Further, it is assumed that whenever AP 14 receives a packet from WCD 2, the AP 14 starts and maintains a timer. This timer maintains a time since the last packet was received from the WCD 2.

At step 420, the AP 14 determines whether the next packet of the packet stream has been received from WCD 2. As above, depending on the embodiment, the packet stream can be a stream of voice packets received in a wireless VoIP call, a stream of text packets received from a messaging application during a messaging call/session, a stream of e-mail packets being received from an e-mail application by the AP 14, a stream of multimedia packets being received by the AP 14 from a multimedia application running on the WCD 2 during a multimedia call/session, etc.

If the AP 14 determines that a packet (or group of packets of the packet stream) has not been received from WCD 2, then the method 400 proceeds to step 440, which will be described below. By contrast, if the AP 14 determines that the next packet of the packet stream has been received from WCD 2, then the timer is reset at step 425, and then at step 430, the AP 14 sends an acknowledgement (ACK) message acknowledging reception of the packet (or group of packets from the wireless WCD 2).

At some point during method 400, the WCD 2 roams from AP 14 to a new AP 16 on the same VLAN which in this case is L3 subnet 10. In this example, WCD 2 is mapped to the same VLAN ID. It is assumed that WCD 2 is no longer in communication range of AP 14, but WCD 2 has not yet associated with a new AP (and disassociated with AP 14). WCD 2 continues to send its next packet of the packet stream to the AP 14; however, at this point, because WCD 2 has roamed out of communication range of AP 14 the particular packet will not be received by AP 14.

At step 440, AP 14 determines if the timer has expired. In other words, AP 14 determines if the amount of time since AP 14 has received its last packet from WCD 2. If the timer has not expired, then the method 400 loops back to step 420 where the AP 14 again determines if the next packet of the packet stream has been received. The timer continues to run. This loop continues until the next packet of the packet stream has been received or the timer expires. If the next packet of the packet stream has been received, then the timer is reset at step 425 and the method 400 proceeds as described above with respect to step 430.

If the timer has expired, this indicates that the connection between AP 14 and WCD 2 has likely failed. In other words, because the duration since AP 14 has received its last packet from WCD 2 exceeds a connection failure time, the AP 14 determines that the connection between AP 14 and WCD 2 has likely failed.

At this point, in one implementation, the method 400 proceeds to step 450, where AP 14 transmits a transfer message to its neighbor APs 16, 18, 19. The incoming transfer message specifies the source address of the WCD 2 (and/or the destination MAC address of AP 14), and an indication that any packet(s) received having the source address of WCD 2 (and/or the destination MAC address of AP 14) should be routed back to AP 14 by the neighbor AP upon receipt. As such, if the AP 14 is within the communication range of one of the neighbor APs 16, 18, 19, then AP 14 will receive the particular packet (or group of packets or the packet stream) from its neighbor AP seamlessly as if the WCD 2 had never roamed out of the coverage area of AP 14.

When a neighbor AP receives the incoming transfer message from AP 14, at step 460, those neighbor APs begin to inspect packets they receive and determine if any packets have a source address that is the MAC address of WCD 2 (and/or a destination address that is the MAC address of AP 14). At step 470, when a neighbor AP receives the particular packet which includes the MAC address of WCD 2 as the source address (and/or the MAC address of AP 14 as the destination address), that neighbor AP transmits a receive ACK message to WCD 2 with the source address set to the MAC address of WCD 2, and forwards the particular packet to AP 14. When the neighbor AP forwards the particular packet (or group of packets of the packet stream) to AP 14, the neighbor AP does not change the source address to the MAC address of the neighbor AP; instead, the neighbor AP keeps the source address as the MAC address of the WCD 2. By contrast, in another implementation, upon receiving a packet (or group of packets of the packet stream) having the source address of the WCD 2 (and/or the destination MAC address of AP 14) (as specified in a transfer message received by the neighbor AP), the neighbor AP uses the MAC address of the AP 14 as the destination address of the packet to route the packet back to the wireless switch 12 that the AP 14 is coupled to, and the wireless switch 12 sends the packet to AP 14. Forwarding directly to the AP 14 is useful, for example, where the individual APs perform decryption locally.

At step 480, AP 14 receives the packet transmitted from WCD 2, and then continues receiving the packet stream (or any future packets in the packet stream) from the neighbor AP until WCD 2 has successfully re-associated with the neighbor AP and dropped its call/session with AP 14.

Thus, techniques have been disclosed which allow wireless client devices to roam between APs. These techniques can be used to support roaming and allow a WCD to continue receiving packets when the WCD undergoes a roam to a new AP. Packets which would be lost or dropped in conventional networks are transparently forwarded to a neighbor AP so that packets associated with existing calls or sessions are not lost during roaming. These techniques can also help reduce the likelihood of interrupted or dropped calls or sessions.

In the claims which follow, the sequence of the text in any of the claims does not imply that process steps must be performed in a temporal or logical order unless specifically defined by the language of the claim. The process steps may be interchanged in any order without departing from the scope of the invention as long as such an interchange is logical and does not contradict the claim language. Furthermore, numerical ordinals such as "first," "second," "third," etc. simply denote different singles of a plurality and do not imply any order or sequence unless specifically defined by the claim language.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. For example, while the techniques and technologies described above have been described in the context of WLANs which include wireless switches and access ports (APs), it will be appreciated that in some implementations these techniques and technologies can also be applied in environments were wireless switches and APs are not utilized or where the functionality of the wireless switch is implemented within the AP. For instance, these techniques and technologies can be applied in a network which does not include wireless switches—this case is identical to a wireless switch with one AP merged together.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should also be understood that various changes can be made in the function and arrangement of elements without departing from the scope of the invention as set forth in the appended claims and the legal equivalents thereof. Thus, the present invention is not intended to be limited to the embodiments shown herein but is to be accorded the widest scope consistent with the principles and novel features disclosed herein.

What is claimed is:

1. In a network comprising a wireless device, a first access point (AP) and a plurality of neighbor APs, a method for lossless roaming comprising:
    transmitting a packet of a packet stream from the first AP to the wireless device when the wireless device begins to move away from the first AP toward at least one of the neighbor APs;
    determining, at the first AP, whether an acknowledgement (ACK) message was received by the first AP for the packet;
    if the first AP has not received the ACK message from the wireless device acknowledging reception of the packet;
    forwarding the packet from the first AP to the neighbor APs; and
    transmitting the packet from the neighbor APs to all devices within communication range including the wireless device, wherein the first AP and neighbor APs are each configured with a common encryption key.

2. A method according to claim 1, wherein the step of forwarding includes receiving the packet at the neighbor APs, and formatting the source address field of the packet with the MAC address of the first AP.

3. A method according to claim 1, wherein the step of forwarding the packet from the first AP to the neighbor APs, further comprises:
    transmitting a transfer message to the neighbor APs before forwarding the packet to the neighbor APs, wherein the transfer message communicates that AP is forwarding the packet and that the packet is to be sent to wireless device.

4. A method according to claim 1, the first AP and the neighbor APs are configured as part of a common subnet of a common wireless switch.

* * * * *

UNITED STATES PATENT AND TRADEMARK OFFICE
CERTIFICATE OF CORRECTION

| | | |
|---|---|---|
| PATENT NO. | : 8,111,676 B2 | Page 1 of 1 |
| APPLICATION NO. | : 11/942422 | |
| DATED | : February 7, 2012 | |
| INVENTOR(S) | : Sekhar | |

It is certified that error appears in the above-identified patent and that said Letters Patent is hereby corrected as shown below:

On the Title Page, in item (54), and Column 1, Line 1, in Title, delete "LOSELESS" and insert -- LOSSLESS --, therefor.

In Column 8, Line 56, delete ""retranmits"" and insert -- "retransmits" --, therefor.

In Column 12, Line 51, in Claim 4, delete "1, the" and insert -- 1, wherein the --, therefor.

Signed and Sealed this
Eighteenth Day of December, 2012

David J. Kappos
*Director of the United States Patent and Trademark Office*